United States Patent
Ryon et al.

(10) Patent No.: US 12,092,333 B2
(45) Date of Patent: Sep. 17, 2024

(54) RADIALLY ORIENTED INTERNALLY MOUNTED CONTINUOUS IGNITION DEVICE

(71) Applicant: Collins Engine Nozzles, Inc., Des Moines, IA (US)

(72) Inventors: Jason Ryon, Carlisle, IA (US); Brandon P. Williams, Johnston, IA (US); Lev Alexander Prociw, Johnston, IA (US)

(73) Assignee: COLLINS ENGINE NOZZLES, INC., Des Moines, IA (US)

( * ) Notice: Subject to any disclaimer, the term of this patent is extended or adjusted under 35 U.S.C. 154(b) by 0 days.

(21) Appl. No.: 18/120,183

(22) Filed: Mar. 10, 2023

(65) Prior Publication Data

US 2023/0213196 A1 Jul. 6, 2023

Related U.S. Application Data

(63) Continuation-in-part of application No. 17/125,072, filed on Dec. 17, 2020, now abandoned.

(51) Int. Cl.
*F23R 3/00* (2006.01)
*F02C 7/264* (2006.01)
*F23R 3/34* (2006.01)

(52) U.S. Cl.
CPC .............. *F23R 3/343* (2013.01); *F02C 7/264* (2013.01); *F05D 2240/35* (2013.01); *F05D 2260/99* (2013.01)

(58) Field of Classification Search
None
See application file for complete search history.

(56) References Cited

U.S. PATENT DOCUMENTS

| 2,540,642 A | 2/1951 | Sidney et al. |
| 2,541,900 A | 2/1951 | Williams |

(Continued)

FOREIGN PATENT DOCUMENTS

| DE | 1064760 B | 9/1959 |
| DE | 102018214281 B3 | 8/2019 |

(Continued)

OTHER PUBLICATIONS

Communication Pursuant to Article 94(3) EPC for EP Application No. 21213899.4, dated Apr. 26, 2023, 7 pages.

(Continued)

*Primary Examiner* — Edwin Kang
(74) *Attorney, Agent, or Firm* — Kinney & Lange, P.A.

(57) ABSTRACT

An embodiment of a combustor for a gas turbine engine includes a combustor case, a combustor liner disposed within the combustor case, a fuel nozzle, and a torch igniter within the combustor case. The torch igniter includes a combustion chamber, a cap defining the upstream end of the combustion chamber and configured to receive a fuel injector and a surface igniter, a tip defining the downstream end of the combustion chamber, an annular igniter wall extending from the cap to the tip and defining a radial extent of the combustion chamber, a structural wall coaxial with and surrounding the igniter wall, and an outlet passage within the tip that fluidly connects the combustion chamber to the combustor. The torch igniter is situated such that the tip is mounted through the combustor liner, the combustion chamber is within the combustor case, and the cap extends through the combustor case.

14 Claims, 5 Drawing Sheets

(56) References Cited

U.S. PATENT DOCUMENTS

| | | | | |
|---|---|---|---|---|
| 2,645,082 | A | 7/1953 | Sarto | |
| 2,648,951 | A | 8/1953 | McDougal | |
| 2,734,341 | A | 2/1956 | Lovesey | |
| 2,784,553 | A | 3/1957 | De et al. | |
| 2,811,676 | A | 10/1957 | Beye | |
| 2,840,742 | A | 6/1958 | Watters | |
| 2,847,826 | A | 8/1958 | Dennis | |
| 2,864,234 | A | 12/1958 | Seglem et al. | |
| 2,885,859 | A | 5/1959 | Fortunato | |
| 2,958,196 | A * | 11/1960 | Gatzemeyer | F23Q 13/00 |
| | | | | 60/39.826 |
| 2,967,224 | A | 1/1961 | Irwin | |
| 3,009,321 | A | 11/1961 | Jones et al. | |
| 3,487,636 | A | 1/1970 | Vdoviak et al. | |
| 3,558,251 | A | 1/1971 | Bauger et al. | |
| 3,690,093 | A | 9/1972 | Carlisle | |
| 3,898,797 | A * | 8/1975 | Wood | F23R 3/002 |
| | | | | 60/737 |
| 3,954,389 | A * | 5/1976 | Szetela | F23M 5/085 |
| | | | | 60/753 |
| 3,990,834 | A | 11/1976 | Dubell et al. | |
| 4,012,904 | A | 3/1977 | Nogle | |
| 4,099,373 | A | 7/1978 | Griffin et al. | |
| 4,112,675 | A | 9/1978 | Pillsbury et al. | |
| 4,141,213 | A | 2/1979 | Ross | |
| 4,192,139 | A | 3/1980 | Buchheim | |
| 4,194,358 | A * | 3/1980 | Stenger | F23R 3/42 |
| | | | | 60/776 |
| 4,351,156 | A | 9/1982 | White et al. | |
| 4,412,414 | A | 11/1983 | Novick et al. | |
| 4,441,323 | A | 4/1984 | Colley | |
| 4,828,488 | A | 5/1989 | Reiser et al. | |
| 4,860,533 | A | 8/1989 | Joshi | |
| 4,912,931 | A * | 4/1990 | Joshi | F23M 5/00 |
| | | | | 60/753 |
| 4,915,615 | A | 4/1990 | Kawamura et al. | |
| 5,085,040 | A | 2/1992 | Tilston | |
| 5,390,855 | A | 2/1995 | Mims et al. | |
| 5,469,700 | A | 11/1995 | Corbett et al. | |
| 5,499,497 | A | 3/1996 | Defreitas | |
| 5,505,045 | A | 4/1996 | Lee et al. | |
| 5,636,511 | A | 6/1997 | Pfefferle et al. | |
| 5,640,841 | A * | 6/1997 | Crosby | F02C 7/264 |
| | | | | 60/776 |
| 5,673,554 | A | 10/1997 | Defreitas et al. | |
| 5,695,328 | A | 12/1997 | Defreitas et al. | |
| 5,720,163 | A | 2/1998 | Pfefferle et al. | |
| 5,744,206 | A | 4/1998 | Russek et al. | |
| 5,845,480 | A | 12/1998 | Defreitas et al. | |
| 6,138,654 | A | 10/2000 | Pretorius et al. | |
| 6,182,436 | B1 | 2/2001 | Prociw et al. | |
| 6,195,247 | B1 | 2/2001 | Cote et al. | |
| 6,240,731 | B1 | 6/2001 | Hoke et al. | |
| 6,247,300 | B1 | 6/2001 | Muramatsu et al. | |
| 6,483,022 | B1 | 11/2002 | Packard | |
| 6,884,967 | B1 | 4/2005 | Leigh | |
| 6,915,638 | B2 | 7/2005 | Runkle et al. | |
| 6,952,927 | B2 * | 10/2005 | Howell | F23R 3/343 |
| | | | | 60/804 |
| 6,968,699 | B2 | 11/2005 | Howell et al. | |
| 7,124,724 | B2 | 10/2006 | Fleetwood | |
| 7,137,255 | B2 | 11/2006 | Schmotolocha et al. | |
| 7,216,488 | B2 | 5/2007 | Howell et al. | |
| 7,470,875 | B1 | 12/2008 | Wilcox et al. | |
| 7,481,248 | B2 | 1/2009 | Prociw et al. | |
| 7,637,094 | B2 | 12/2009 | Costello et al. | |
| 8,365,710 | B2 | 2/2013 | Lykowski et al. | |
| 8,713,944 | B2 | 5/2014 | Bleeker | |
| 9,080,772 | B2 | 7/2015 | Prociw et al. | |
| 9,135,755 | B2 | 9/2015 | Youssef | |
| 9,279,398 | B2 | 3/2016 | McAlister | |
| 9,413,141 | B2 | 8/2016 | Leglaye et al. | |
| 9,453,491 | B2 | 9/2016 | Tanaka et al. | |
| 9,476,399 | B1 | 10/2016 | Munson | |
| 9,567,912 | B2 | 2/2017 | Prociw et al. | |
| 10,041,859 | B2 | 8/2018 | Desilva et al. | |
| 10,156,189 | B2 | 12/2018 | Sze et al. | |
| 10,488,047 | B2 | 11/2019 | Ott et al. | |
| 10,584,639 | B2 | 3/2020 | Dam et al. | |
| 10,711,699 | B2 | 7/2020 | Dam et al. | |
| 10,823,398 | B2 | 11/2020 | Choudhri et al. | |
| 11,209,164 | B1 | 12/2021 | Ryon et al. | |
| 11,226,103 | B1 | 1/2022 | Ryon et al. | |
| 11,255,535 | B1 | 2/2022 | Eckert et al. | |
| 11,473,505 | B2 | 10/2022 | Ryon et al. | |
| 2002/0050061 | A1 | 5/2002 | Komyoji et al. | |
| 2002/0162333 | A1 * | 11/2002 | Zelina | F23R 3/286 |
| | | | | 60/737 |
| 2004/0050061 | A1 | 3/2004 | Schmotolocha et al. | |
| 2004/0168442 | A1 | 9/2004 | Schmotolocha et al. | |
| 2005/0053876 | A1 | 3/2005 | Joos et al. | |
| 2005/0166595 | A1 | 8/2005 | Fletcher et al. | |
| 2005/0284442 | A1 | 12/2005 | Stuttaford et al. | |
| 2006/0054233 | A1 | 3/2006 | Prociw et al. | |
| 2006/0168967 | A1 | 8/2006 | Simons et al. | |
| 2008/0036209 | A1 | 2/2008 | Bulkovitch | |
| 2008/0141651 | A1 | 6/2008 | Eason et al. | |
| 2008/0299504 | A1 | 12/2008 | Horn | |
| 2009/0234555 | A1 | 9/2009 | Williams et al. | |
| 2009/0314000 | A1 | 12/2009 | Evulet et al. | |
| 2010/0043444 | A1 | 2/2010 | Gross et al. | |
| 2010/0071343 | A1 | 3/2010 | Yu | |
| 2010/0126617 | A1 | 5/2010 | Stroempl et al. | |
| 2011/0088409 | A1 | 4/2011 | Carlisle | |
| 2011/0113787 | A1 | 5/2011 | Milosavljevic | |
| 2011/0247341 | A1 | 10/2011 | McMahan et al. | |
| 2011/0247590 | A1 | 10/2011 | Donovan | |
| 2011/0271684 | A1 | 11/2011 | Corsmeier et al. | |
| 2012/0085468 | A1 | 4/2012 | Walker | |
| 2012/0125008 | A1 | 5/2012 | Prociw et al. | |
| 2012/0234013 | A1 | 9/2012 | Overman et al. | |
| 2012/0266604 | A1 | 10/2012 | Popovic et al. | |
| 2013/0000323 | A1 | 1/2013 | Kupratis | |
| 2013/0040255 | A1 | 2/2013 | Shi et al. | |
| 2013/0143171 | A1 | 6/2013 | Soda et al. | |
| 2013/0174562 | A1 | 7/2013 | Holcomb et al. | |
| 2013/0283800 | A1 | 10/2013 | Romig et al. | |
| 2014/0060063 | A1 | 3/2014 | Boardman et al. | |
| 2014/0150401 | A1 | 6/2014 | Venter | |
| 2014/0215997 | A1 | 8/2014 | Lior et al. | |
| 2014/0216384 | A1 | 8/2014 | Tanaka et al. | |
| 2014/0260304 | A1 | 9/2014 | Cummings et al. | |
| 2014/0290259 | A1 | 10/2014 | Plante et al. | |
| 2014/0314548 | A1 | 10/2014 | Rivers et al. | |
| 2014/0366505 | A1 * | 12/2014 | Prociw | F02C 7/266 |
| | | | | 60/39.821 |
| 2014/0366542 | A1 | 12/2014 | Teets | |
| 2014/0366551 | A1 | 12/2014 | Prociw et al. | |
| 2015/0036781 | A1 | 2/2015 | Youssef | |
| 2015/0040575 | A1 | 2/2015 | Martinez Fabre et al. | |
| 2015/0260406 | A1 | 9/2015 | Carrere | |
| 2015/0275755 | A1 | 10/2015 | Ogata et al. | |
| 2015/0275769 | A1 | 10/2015 | Foutch et al. | |
| 2015/0308351 | A1 | 10/2015 | Sheridan | |
| 2015/0345426 | A1 | 12/2015 | Houston et al. | |
| 2015/0345788 | A1 | 12/2015 | Miyata et al. | |
| 2015/0354517 | A1 | 12/2015 | Mansour et al. | |
| 2016/0003150 | A1 | 1/2016 | DiCintio et al. | |
| 2016/0010559 | A1 | 1/2016 | Hoke et al. | |
| 2016/0047318 | A1 | 2/2016 | Dam et al. | |
| 2016/0084169 | A1 | 3/2016 | Stuttaford et al. | |
| 2016/0169110 | A1 | 6/2016 | Myers et al. | |
| 2016/0230993 | A1 | 8/2016 | Dai et al. | |
| 2017/0082022 | A1 | 3/2017 | Lee | |
| 2017/0138266 | A1 | 5/2017 | Caples | |
| 2017/0145852 | A1 | 5/2017 | McCune et al. | |
| 2017/0284298 | A1 | 10/2017 | Suciu et al. | |
| 2017/0298822 | A1 | 10/2017 | Garde La Casa | |
| 2017/0350590 | A1 | 12/2017 | Choudhri et al. | |
| 2017/0356656 | A1 | 12/2017 | Ogata et al. | |
| 2018/0003388 | A1 | 1/2018 | Park | |
| 2018/0010795 | A1 * | 1/2018 | Nath | F23R 3/002 |
| 2018/0051710 | A1 * | 2/2018 | Takamura | F04D 29/321 |

(56) References Cited

U.S. PATENT DOCUMENTS

| | | | |
|---|---|---|---|
| 2018/0058224 A1* | 3/2018 | Jennings | F02C 3/04 |
| 2018/0058331 A1* | 3/2018 | Barton | F02C 7/28 |
| 2018/0058404 A1 | 3/2018 | Tibbs | |
| 2018/0100437 A1 | 4/2018 | DiCintio et al. | |
| 2018/0134407 A1 | 5/2018 | Elbibary et al. | |
| 2018/0154446 A1 | 6/2018 | Brown et al. | |
| 2018/0170575 A1 | 6/2018 | Ziarno | |
| 2018/0172271 A1* | 6/2018 | Moniz | F23R 3/283 |
| 2018/0179896 A1 | 6/2018 | Pal et al. | |
| 2018/0179956 A1 | 6/2018 | Wertz | |
| 2018/0283692 A1 | 10/2018 | Ryon et al. | |
| 2018/0356095 A1* | 12/2018 | Patel | F23R 3/283 |
| 2018/0363555 A1 | 12/2018 | Zelina et al. | |
| 2019/0010872 A1 | 1/2019 | Dam et al. | |
| 2019/0024897 A1 | 1/2019 | Prociw et al. | |
| 2019/0032561 A1 | 1/2019 | Stoia et al. | |
| 2019/0178497 A1 | 6/2019 | Jones et al. | |
| 2019/0249877 A1 | 8/2019 | Fryer | |
| 2019/0257522 A1 | 8/2019 | Myatlev et al. | |
| 2020/0080530 A1 | 3/2020 | Freer et al. | |
| 2020/0088409 A1 | 3/2020 | Greenfield et al. | |
| 2020/0191059 A1 | 6/2020 | Ryon et al. | |
| 2020/0309378 A1 | 10/2020 | Dam et al. | |
| 2020/0348024 A1* | 11/2020 | Hicks | F23R 3/50 |
| 2021/0215100 A1 | 7/2021 | Head et al. | |
| 2022/0007488 A1 | 1/2022 | Bai et al. | |
| 2022/0195933 A1 | 6/2022 | Ryon et al. | |
| 2022/0195934 A1 | 6/2022 | Ryon et al. | |
| 2022/0364516 A1 | 11/2022 | Dam et al. | |

FOREIGN PATENT DOCUMENTS

| | | | |
|---|---|---|---|
| EP | 2189720 A1 | 5/2010 | |
| EP | 3128166 A1 | 2/2017 | |
| EP | 2677240 B1 | 4/2020 | |
| FR | 970988 A | 1/1951 | |
| FR | 1218296 A | 5/1960 | |
| GB | 693846 A | 7/1953 | |
| GB | 791990 A | 3/1958 | |
| GB | 819141 A | 8/1959 | |
| GB | 859184 A | 1/1961 | |
| JP | 2015021715 A | 2/2015 | |
| KR | 101279722 B1 | 6/2013 | |

OTHER PUBLICATIONS

"Metal Seal Design Guide—High Performance Engineered Seals and Sealing Systems", from Parker Hannifin Corporation Composite Sealing Systems Division, 2016, 106 pages.
Database WPI—2017 Clarivate Analytics, Week 201919, Thomson Scientific, London GB; an 2019-17673X XP002806356, 2 pages.
Extended European Search Report for EP Application No. 21192156.4, dated Feb. 1, 2022, 7 pages.
Extended European Search Report for EP Application No. 21201782.6, dated Mar. 28, 2022, 10 pages.
Extended European Search Report for EP Application No. 21205035.5, dated Mar. 28, 2022, 9 pages.
Extended European Search Report for EP Application No. 21205393.8, dated Mar. 17, 2022, 8 pages.
Extended European Search Report for EP Application No. 21212869.8, Dated Apr. 28, 2022, pp. 7.
Extended European Search Report for EP Application No. 21213899.4, dated May 6, 2022, 8 pages.
Extended European Search Report for EP Application No. 21214138.6, dated Apr. 25, 2022, 7 pages.
Extended European Search Report for EP Application No. 21214511.4, dated Apr. 29, 2022, 8 pages.
Extended European Search Report for EP Application No. 21214798.7, dated May 11, 2022, 8 pages.
Extended European Search Report for EP Application No. 21214883.7, Dated May 13, 2022, pp. 10.
Extended European Search Report for EP Application No. 21214894.4, dated May 3, 2022, 9 pages.
Extended European Search Report for EP Application No. 21215655.8, dated May 2, 2022, 8 pages.
Extended European Search Report for EP Application No. 21215709.3, dated May 12, 2022, 9 pages.
Extended European Search Report for EP Application No. 21216163.2, Dated May 16, 2022, pp. 8.
Extended European Search Report for EP Application No. 21209057.5, dated Jul. 19, 2022, 8 pages.
Extended European Search Report for European Patent Application #24162487.3, Dated Jul. 11, 2024, 8 Pages.

* cited by examiner

RADIALLY ORIENTED INTERNALLY MOUNTED CONTINUOUS IGNITION DEVICE

CROSS-REFERENCE TO RELATED APPLICATION(S)

This application is a continuation-in-part of U.S. application Ser. No. 17/125,072 filed Dec. 17, 2020, for "RADIALLY ORIENTED INTERNALLY MOUNTED CONTINUOUS IGNITION DEVICE" by J. Ryon, B. P. Williams, and L. A. Prociw.

BACKGROUND

The present disclosure relates to gas turbine engines and, more particularly, to orientations of torch igniters used in the combustor section of a gas turbine engine.

Torch igniters can be used in lieu of spark igniters to provide an ignition source for combustors located in gas turbine engines. Torch igniters provide a flame as an ignition source for a combustor rather than the electric current provided by spark igniters. Torch igniters mounted externally to a high pressure case of the gas turbine engine must be able to withstand a high pressure differential to prevent leaks. Mounting torch igniters within a high pressure case of the gas turbine engine does not require the torch igniters to withstand this high pressure differential. However, torch igniters mounted within the high pressure case can experience extremely high temperatures during engine operation. These high temperature conditions can damage temperature-sensitive elements of the torch igniter.

SUMMARY

In one embodiment, the present specification provides a combustor of a gas turbine engine that includes a combustor case extending along a primary combustor centerline to convey compressed airflow from a compressor to a turbine section, a combustor liner disposed within the combustor case to define a main combustor zone, at least one fuel nozzle situated at an upstream end of the combustor liner, relative to the primary combustor centerline, and a torch igniter situated partially within the combustor case. The combustor case includes a torch igniter opening. The torch igniter includes a combustion chamber extending along a torch igniter axis and having axially upstream and downstream ends defining a flow direction through the combustion chamber with respect to the torch igniter axis, a cap defining the axially upstream end of the combustion chamber with respect to the torch igniter axis, wherein the cap is configured to receive at least one surface igniter and at least one fuel injector, a tip defining the axially downstream end of the combustion chamber with respect to the torch igniter axis, an annular igniter wall extending along and surrounding the torch igniter axis from the cap to the tip and defining a radial extent of the combustion chamber, a structural wall coaxial with and surrounding the igniter wall, and an outlet passage defined by the igniter wall within the tip and fluidly connected to the combustion chamber. The torch igniter is situated within the torch igniter opening such that the tip is mounted through the combustor liner, the combustion chamber is within the combustor case, and the cap extends through the combustor case.

In another embodiment, the present specification provides a torch igniter for a combustor of a gas turbine engine that includes a combustion chamber extending along a torch igniter axis and having axially upstream and downstream ends defining a flow direction through the combustion chamber with respect to the torch igniter axis, a cap defining the axially upstream end of the combustion chamber with respect to the torch igniter axis and configured to receive at least one surface igniter and at least one fuel injector, a tip defining the axially downstream end of the combustion chamber with respect to the torch igniter axis, an annular igniter wall extending along and surrounding the torch igniter axis from the cap to the tip and defining a radial extent of the combustion chamber, a structural wall coaxial with and surrounding the igniter wall, and an outlet passage defined by the igniter wall within the tip and fluidly connected to the combustion chamber. The structural wall and the igniter wall are configured for a pressure level within a combustor case of the combustor during operation of the combustor.

Figure 1:
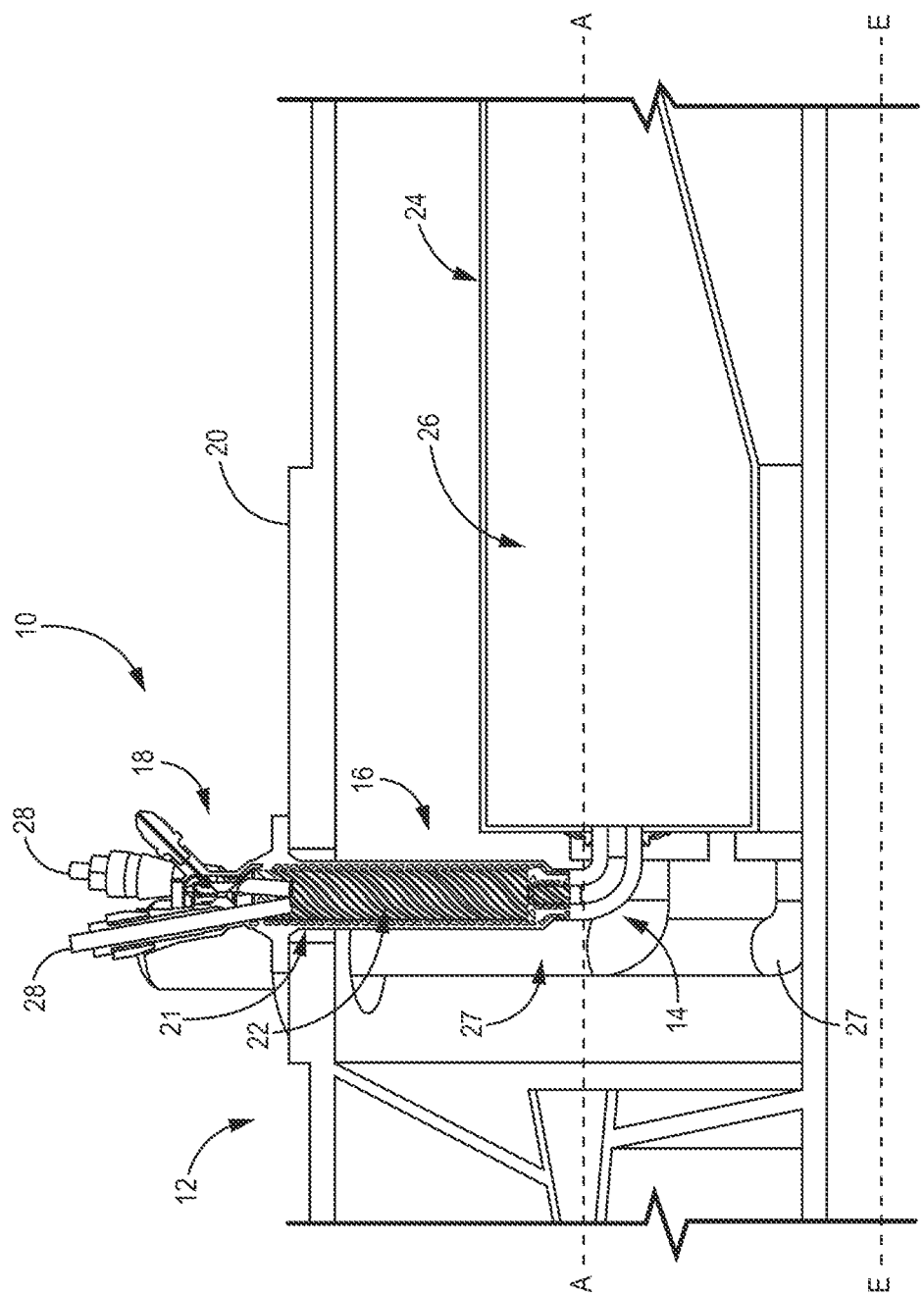
FIG. 1 is a cross-sectional view of an example of a combustor of a gas turbine engine containing a torch igniter.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which also fall within the scope and spirit of the principles of the invention. The figures may not be drawn to scale, and applications and embodiments of the present invention may include features and components not specifically shown in the drawings.

DETAILED DESCRIPTION

The present disclosure provides structures for a combustor of a gas turbine engine containing a torch igniter. The mounting of a torch igniter partially within the high pressure section of a gas turbine engine prevents stress on the combustion chamber of the torch igniter while preventing damage to temperature-sensitive components of the torch igniter, and does not require the torch igniter to be built to withstand a high pressure differential.

The pressure differential experienced by the torch igniter—the difference between the pressure at the exterior of the torch igniter and the pressure within the interior volume of the torch igniter—is determined by the location of the torch igniter. The structural walls of the torch igniter can experience a pressure differential exceeding 800 pounds per square inch (PSI) when a torch igniter is mounted externally to the high pressure case. When the torch igniter is mounted inside the high pressure case, the pressure differential is much lower as the pressure outside the torch igniter is much closer to the internal pressure within the torch igniter. This allows a torch igniter situated within the high pressure case to have thinner structural walls, and additionally allows torch igniter ruptures to be contained within the case.

FIG. 1 is a cross-sectional view of torch igniter 10 disposed within engine combustor section 12 of a gas turbine engine. Torch igniter 10 is composed of tip 14, combustion section 16, and cap 18. Torch igniter 10 extends into high pressure case 20 through torch igniter opening 21, such that combustion chamber 22 of torch igniter 10 is located inside high pressure case 20. Tip 14 of torch igniter 10 is situated within high pressure case 20 and is mounted through liner 24 of combustor 26. Fuel nozzles 27 provide fuel to combustor 26. The gas turbine engine is arranged such that high pressure case 20, liner 24, and combustor 26 are disposed circumferentially about engine axis E-E. Engine axis E-E is a rotational axis of the gas turbine engine. Primary combustor centerline A-A is a centerline for the two-dimensional cross section of engine combustor section 12 shown in FIG. 1. Cap 18 of torch igniter 10 is situated outside high pressure case 20. The example of torch igniter 10 in FIG. 1 is shown as receiving glow plugs 28. Glow plugs 28 are surface igniters which can be resistively heated to ignite fuel from a fuel injector and create combustion within torch igniter 10, creating a flame within combustion chamber 22. Torch igniter 10 intakes air from air inlet section 29 (shown in FIGS. 2-3) disposed in cap 18 of torch igniter 10, and cap 18 is also configured to intake fuel through fuel inlet fitting 30 (shown in FIGS. 2-3). Fuel injector section 31 (shown in FIGS. 2-3) receives air from air inlet section 29 and fuel from fuel inlet fitting 30 in order to atomize the fuel before it enters combustion chamber 22. A portion of the air from air inlet section 29 can be directed through cooling channels between igniter wall 32 and structural wall 36 (both shown in FIGS. 2-4). The air can be high-pressure air from the high-pressure section of the gas turbine engine, or can be from an auxiliary compressor. Combustion chamber 22 is in fluid communication with an internal volume of combustor 26 via an outlet within tip 14, allowing the flame created within combustion chamber 22 to reach the interior of combustor 26 and thereby ignite fuel within combustor 26. Torch igniter 10 can serve as an initial ignition mechanism for combustor 26, as a stabilizer of fuel combustion within combustor 26, or as a relight mechanism for combustor 26. In the example shown in FIG. 1, torch igniter 10 is oriented such that tip 14 is mounted through liner 24, combustion chamber 22 is within high pressure case 20, and cap 18 extends through high pressure case 20.

Figure 2:
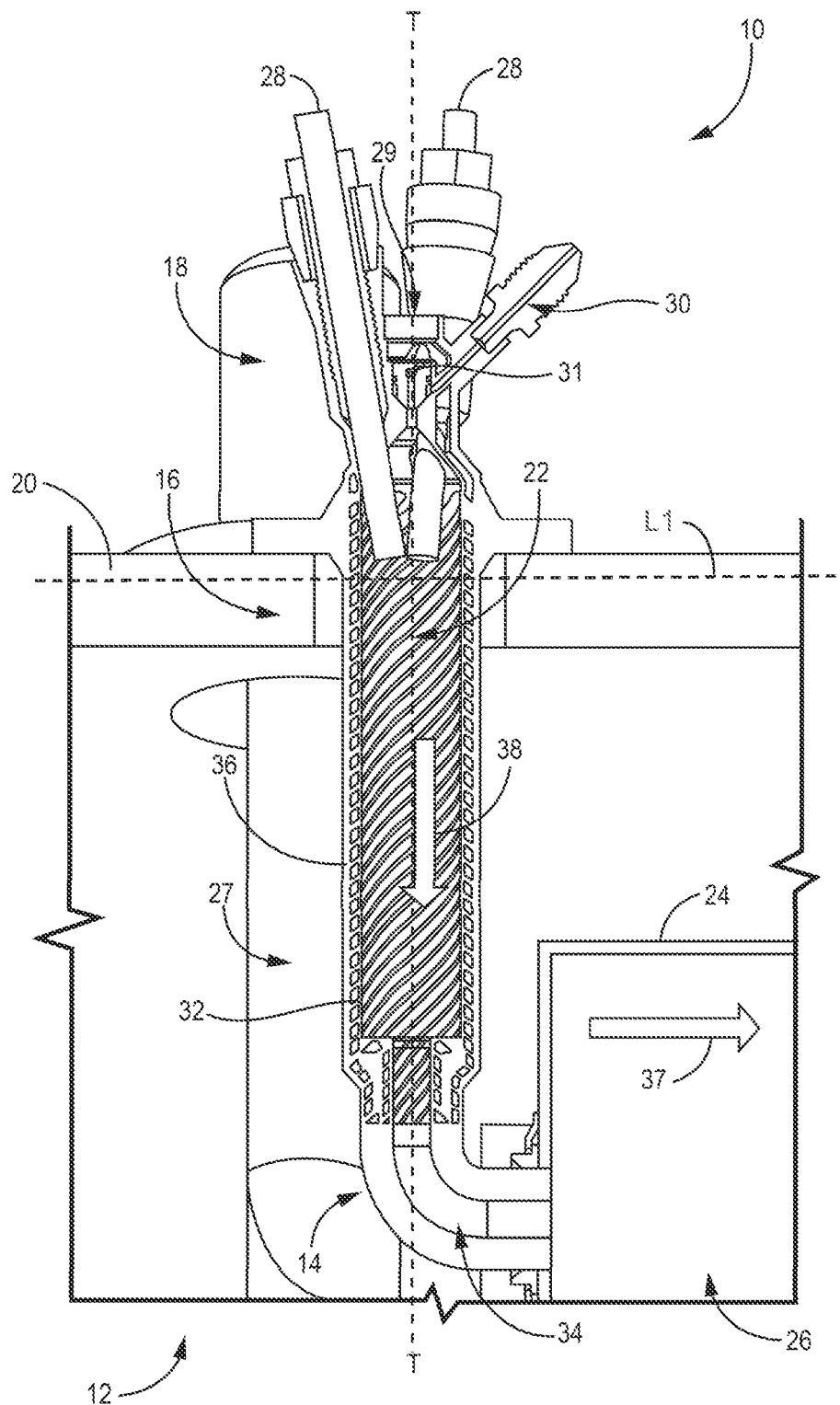
FIG. 2 is a cross-sectional close-up view of an example of the torch igniter of FIG. 1.

FIG. 2 is a cross-sectional view of torch igniter 10. Igniter wall 32 is a housing which surrounds the internal volume of torch igniter 10, which includes combustion chamber 22 and outlet passage 34, such that igniter wall 32 runs from the end of tip 14 to cap 18. Line L1 depicts the transition from igniter wall 32 to cap 18. Igniter wall 32 can be annular where it surrounds combustion chamber 22 and outlet passage 34, and can be dome- or cone-shaped where it extends to cap 18. In the depicted example, igniter wall 32 has a larger diameter where it surrounds combustion chamber 22 than where it surrounds outlet passage 34. Structural wall 36 coaxially surrounds igniter wall 32, and can be separated from igniter wall 32 by cooling channels. Igniter wall 32 is shown transparent in the cross section of FIGS. 1 and 2 for ease of viewing.

Structural wall 36 can, for example, have a thickness of between 0.02 and 0.05 inches due to the location of torch igniter 10 within high pressure case 20. Atmospheric air pressure typically ranges from approximately 5 PSI at altitude to approximately 15 PSI at sea level. High pressure case 20 can, for example, be rated for a pressure ratio of approximately 60:1, and can consequently produce a pressure within high pressure case 20 of up to 840 PSI, in an exemplary case. A torch igniter mounted externally to high pressure case 20 would similarly need to be rated for the pressure ratio of approximately 60:1. This externally mounted torch igniter could experience a pressure differential exceeding 800 PSI (the difference between atmospheric air pressure and the internal pressure within the torch igniter, which is approximately the pressure within the high pressure case), and would consequently require a structural wall thickness of approximately 0.15 inches to approximately 0.3 inches to withstand this pressure differential. Because torch igniter 10 is mounted such that combustion chamber 22 is within high pressure case 20, structural wall 36 can be thinner than would be required of structural walls for torch igniters mounted externally to high pressure case 20, because torch igniter 10 does not need to withstand the pressure difference between the air inside high pressure case 20 and the air outside high pressure case 20. The construction of torch igniter 10 can therefore account for the pressure level within high pressure case 20, where the pressure difference between the internal volume of torch igniter 10 and the external surface of torch igniter 10 is much lower than for a torch igniter located outside a high pressure case. The reduced thickness of structural wall 36 made possible by the mounting location of torch igniter 10 (relative to external mounting) reduces overall part bulk and weight, which are important considerations in aerospace applications. Additionally, the mounting of torch igniter 10 such that combustion chamber 22 is located within high pressure case 20 allows for containment of fuel in the case of rupture or other failure of components of torch igniter 10.

Figure 3:
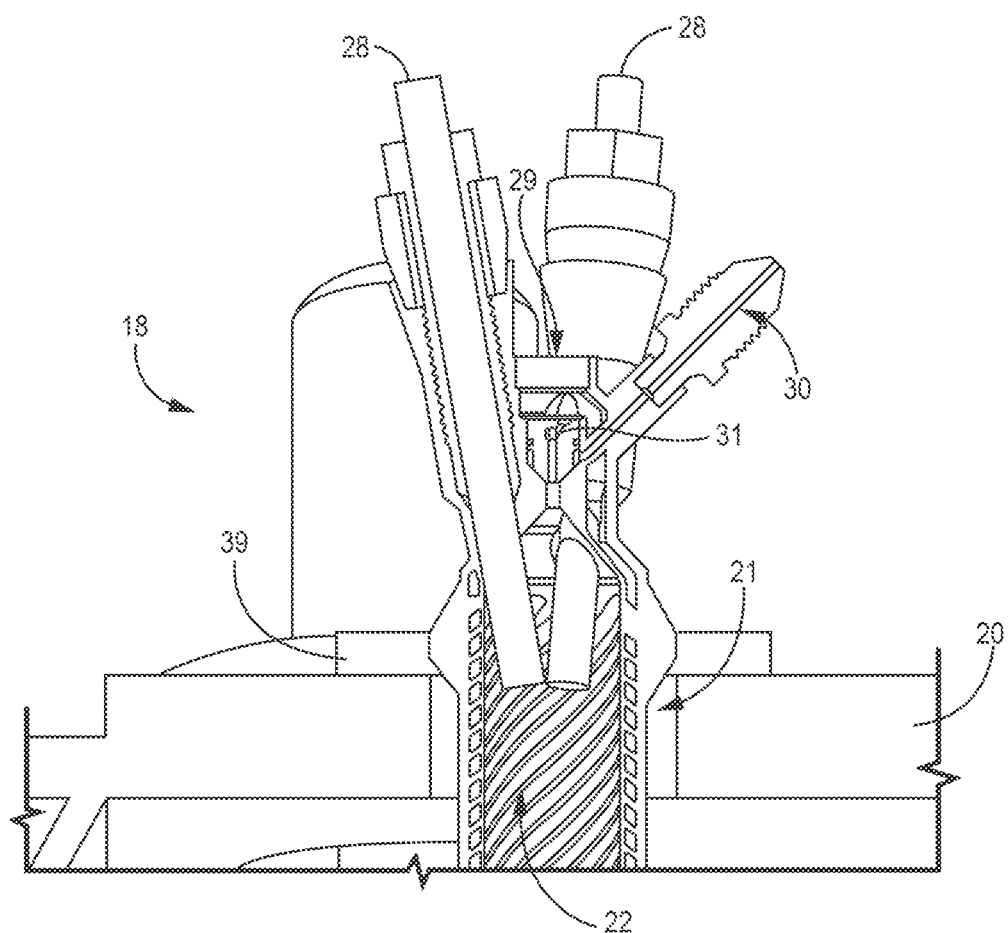
FIG. 3 is a cross-sectional view of an example of a cap section of the torch igniter of FIGS. 1 and 2.

Combustor flow direction 37 shows the general direction of flow for fluids within engine combustor section 12. Torch igniter 10 is arranged such that combustion section 16 and cap 18 are oriented coaxially about torch igniter axis T-T. In the depicted embodiment, torch igniter axis T-T is oriented approximately perpendicular to primary combustor centerline A-A. Igniter flow direction 38 shows the general direction of flow for fluids within combustion chamber 22 of torch igniter 10. Thus, torch igniter 10 has upstream and downstream ends oriented along torch igniter axis T-T and according to the direction of igniter flow direction 38. Air inlet section 29 can be located within cap 18, as shown in FIGS. 2-3, or alternatively can be located within structural wall 36 and igniter wall 32 such that air inlet section 29 feeds into combustion chamber 22 directly. Combustion chamber 22, air inlet section 29, and outlet passage 34 are fluidly connected such that combustion products are able to flow from air inlet section 29, through combustion chamber 22 toward tip 14, and to outlet passage 34. Combustion products are able to exit torch igniter 10 and enter an internal volume of a main combustor, such as combustor 26, via outlet passage 34. To this extent, cap 18 is disposed at the upstream end of torch igniter 10 and tip 14 is disposed at the downstream end of torch igniter 10. It should be understood, however, that tip 14 can be disposed at any suitable location on the downstream end of torch igniter 10.

As described above in reference to FIG. 1, air inlet section 29 can receive high pressure air from an auxiliary compressor (that is, a compressor other than the main compressor which provides air to engine combustor section 12), which in some examples can be connected to an auxiliary power source. In the case of low power starts and/or engine blowout, this auxiliary compressor can provide the necessary mass of air to torch igniter 10 in order to restart the gas turbine engine.

Torch igniter 10 can operate with fuel flow rates as low as approximately 1 pound per hour, and generally operates with fuel flow rates of between 1 and 10 pounds per hour. Torch igniter 10 can intake an amount of air to achieve a fuel-to-air ratio of approximately 1:10. An auxiliary compressor can compress the air flow to a higher pressure, and correspondingly a smaller volume, before it enters air inlet section 29. This can facilitate a smaller size for torch igniter 10 than a torch igniter which is fed off the main compressor. The smaller size and volume of torch igniter 10 allows torch igniter 10 to be placed in locations which are less able to accommodate a larger torch igniter, such as inside high pressure case 20.

FIG. 3 is a cross-sectional view of cap 18 of torch igniter 10. During operation, torch igniter 10 causes combustion within combustion chamber 22 by using a fuel injector to inject a fuel-air mixture that impinges on the surface of glow plug 28. Glow plugs 28 extend through cap 18, such that each glow plug 28 has an internal end and an external end with respect to torch igniter 10. Further, glow plugs 28 can be resistively heated such that they are able to ignite the fuel-air mixture injected through fuel inlet fitting 30 when the fuel-air mixture impinges on the internal ends of glow plugs 28.

In the depicted embodiment, torch igniter 10 is configured to receive three glow plugs 28. However, in other embodiments, torch igniter 10 can be configured to receive one glow plug 28, two glow plugs 28, more than three glow plugs 28, and/or a suitable minimum ignition energy source/device (such as one or more spark plugs). It can be desirable for torch igniter 10 to be configured with multiple glow plugs at multiple locations within combustion chamber 22 to improve ignition of fuel injected through fuel inlet fitting 30. Further, if the injection pattern through fuel inlet fitting 30 is distorted, using multiple glow plugs 28 at multiple locations within combustion chamber 22 can improve the likelihood that the injected fuel impinges on at least one glow plug 28.

Glow plugs 28 are also connected to a power source capable of delivering electric current to the external ends of glow plugs 28, allowing for the electrically-resistive heating of glow plugs 28. In examples where torch igniter 10 contains multiple glow plugs 28, they can be connected to more than one power source or can be connected in series, parallel, or a combination of arrangements to a single power source. Generally, glow plugs 28 are formed of a material capable of being resistively heated. For example, glow plugs 28 can be formed of a ceramic material, such as silicon nitride.

Torch igniter 10 is secured within torch igniter opening 21 by flange 39. Flange 39 circumferentially surrounds torch igniter 10. Flange 39 can be fastened to high pressure case 20 by one or more connectors such as screw-on nuts, bolts, or screws, and can be sealed by sealing devices such as C seals (not shown) to prevent leaks between the flange 39 and high pressure case 20.

Figure 4:
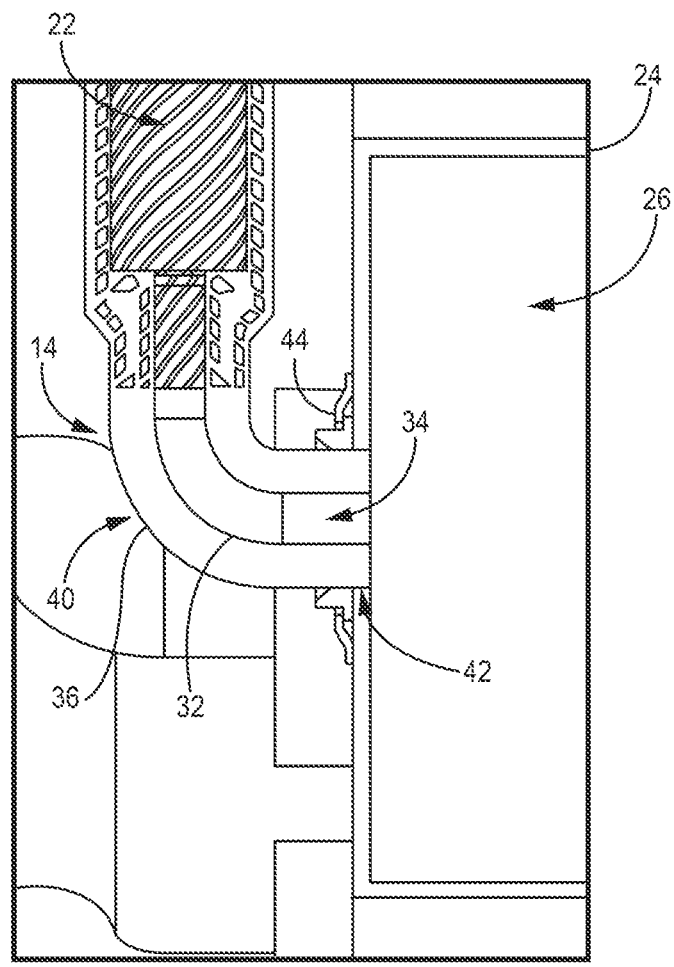
FIG. 4 is a cross-sectional view of an example of an elbow region of the torch igniter of FIGS. 1 and 2.

FIG. 4 is a cross-sectional view of tip 14 of torch igniter 10. Tip 14 consists of elbow 40, igniter wall 32, structural wall 36, and outlet passage 34. Tip 14 is mounted to liner 24 at liner opening 42 and is secured within liner opening 42 by liner seal 44. Liner seal 44 can consist of any suitable seal, such as floating seal collars. The amount of allowed float for liner seal 44 can vary based on tolerances and thermal growth differences. Tip 14 can be slip fit to liner seal 44. Elbow 40 can be cooled by the use of cooling channels within torch igniter 10. In the depicted example, elbow 40 turns approximately 90° between combustion chamber 22 of torch igniter 10 and liner 24 of combustor 26. However, it should be understood that elbow 40 can bend at any suitable angle, including non-90° angles. Most generally, elbow 40 has a shape and orientation suitable to redirect igniter flow from igniter flow direction 38 into combustor 26 and in some embodiments towards combustor flow direction 37.

Figure 5:
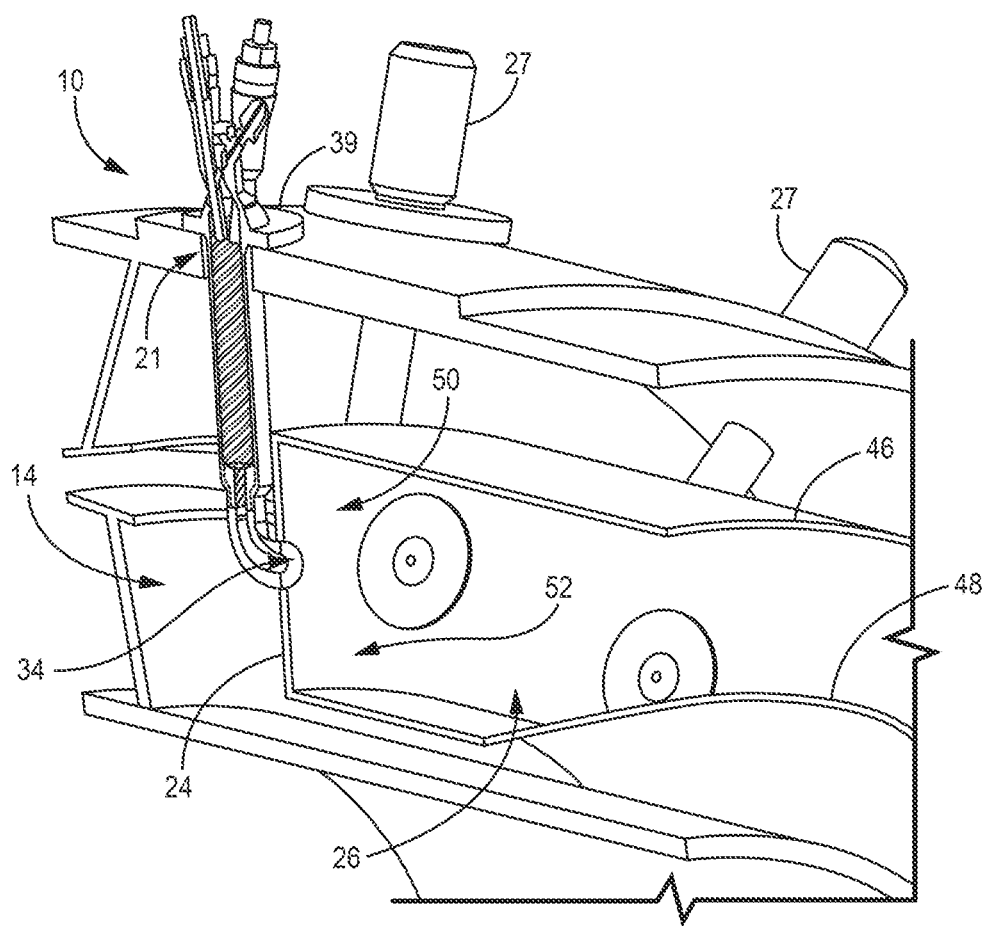
FIG. 5 is a perspective cutaway view of an example of the torch igniter of FIGS. 1 and 2 mounted on a combustor dome.

FIG. 5 is a cutaway view of torch igniter 10 mounted to liner 24. Torch igniter 10 is secured within torch igniter opening 21 by flange 39. In the depicted embodiment, tip 14 of torch igniter 10 is approximately equidistant from external edge 46 and internal edge 48 of liner 24. However, tip 14 of torch igniter 10 can be mounted through various other sections of liner 24 in order to optimize the ability of torch igniter 10 to ignite, stabilize, or relight combustor 26. For example, it might be advantageous to situate torch igniter 10 such that tip 14 can ignite fuel in outer recirculation zone 50 or inner recirculation zone 52 of combustor 26 in order to stabilize combustion within combustor 26. The location of tip 14 with respect to fuel nozzles 27 can also be varied to optimize the efficacy of torch igniter 10. In the example depicted in FIG. 5, tip 14 is at an upstream end of liner 24 and interfaces with combustor 26 through the dome wall. This provides an advantage over examples which mount the torch igniter through the side walls of the combustor, which can disrupt cooling of the side walls.

The internal volume of a torch igniter mounted external to the high pressure case of a combustor experiences much higher pressure and temperatures than the external surface of the torch igniter. This can cause stress on the torch igniter, particularly on the igniter wall and structural wall, and can increase the risk of rupture or other mechanical failure. Mounting a torch igniter such that the combustion chamber is within the high pressure case is therefore desirable to avoid strain on the structural components of the torch igniter. Situating the combustion chamber internally also allows for containment within the high pressure case if the torch igniter ruptures. With the torch igniter positioned through the high pressure case, pressure- and temperature-sensitive elements such as electrical connections to a power source can be located outside the case. This orientation combines the advantages of mounting schemes which are completely external and ones which are completely internal.

Discussion of Possible Embodiments

The following are non-exclusive descriptions of possible embodiments of the present invention.

An example of an embodiment of a combustor of a gas turbine engine oriented along an engine axis, among other possible things includes a combustor case extending along a primary combustor centerline to convey compressed airflow from a compressor to a turbine section, a combustor liner disposed within the combustor case to define a main combustor zone, at least one fuel nozzle situated at an upstream end of the combustor liner relative to the primary combustor axis, and a torch igniter situated partially within the combustor case. The combustor case includes a torch igniter opening. The torch igniter includes a combustion chamber extending along a torch igniter axis and having axially upstream and downstream ends defining a flow direction through the combustion chamber with respect to the torch igniter axis, a cap defining the axially upstream end of the combustion chamber with respect to the torch igniter axis and configured to receive at least one surface igniter and at least one fuel injector, a tip defining the axially downstream end of the combustion chamber with respect to the torch igniter axis, an annular igniter wall extending along and surrounding the torch igniter axis from the cap to the tip and defining a radial extent of the combustion chamber, a structural wall coaxial with and surrounding the igniter wall, and an outlet passage defined by the igniter wall within the tip and fluidly connected to the combustion chamber. The torch igniter is situated within the torch igniter opening such that the tip is mounted through the combustor liner, the combustion chamber is within the combustor case, and the cap extends through the combustor case.

The combustor of the preceding paragraph can optionally include, additionally and/or alternatively, any one or more of the following features, configurations and/or additional components:

A further embodiment of the foregoing combustor, wherein the torch igniter is oriented such that the torch igniter axis extends radially inward with respect to the primary combustor centerline and the engine axis.

A further embodiment of any of the foregoing combustors, wherein the tip comprises an elbow between the combustion chamber and the combustor liner.

A further embodiment of any of the foregoing combustors, wherein the elbow turns 90 degrees from the combustion chamber to the combustor liner.

A further embodiment of any of the foregoing combustors, wherein a flange is connected to the combustor case and secures the torch igniter within the torch igniter opening and to the combustor case.

A further embodiment of any of the foregoing combustors, wherein the tip of the torch igniter is mounted to the combustor liner at an axially upstream end of the combustor liner with respect to the primary combustor centerline.

A further embodiment of any of the foregoing combustors, wherein the torch igniter ignites fuel in an outer recirculation zone of the combustor.

A further embodiment of any of the foregoing combustors, wherein the torch igniter ignites fuel in an inner recirculation zone of the combustor.

A further embodiment of any of the foregoing combustors, wherein the torch igniter axis is oriented perpendicular to the primary combustor centerline.

A further embodiment of any of the foregoing combustors, wherein the cap is configured to receive at least three surface igniters.

A further embodiment of any of the foregoing combustors, wherein the torch igniter is positioned between two fuel nozzles of the combustor.

An example of an embodiment of a torch igniter for a combustor of a gas turbine engine includes a combustion chamber extending along a torch igniter axis and having axially upstream and downstream ends defining a flow direction through the combustion chamber with respect to the torch igniter axis, a cap defining the axially upstream end of the combustion chamber with respect to the torch igniter axis and configured to receive at least one surface igniter and at least one fuel injector, a tip defining the axially downstream end of the combustion chamber with respect to the torch igniter axis, an annular igniter wall extending along and surrounding the torch igniter axis from the cap to the tip and defining a radial extent of the combustion chamber, a structural wall coaxial with and surrounding the igniter wall, and an outlet passage defined by the igniter wall within the tip and fluidly connected to the combustion chamber. The structural wall and the igniter wall are configured for a pressure level within a combustor case of the combustor during operation of the combustor.

A further embodiment of the foregoing torch igniter, wherein the tip includes an elbow downstream of the combustion chamber.

A further embodiment of any of the foregoing torch igniters, wherein the elbow turns 90 degrees with respect to the torch igniter axis.

A further embodiment of any of the foregoing torch igniters, wherein a flange is connected to a combustor case of the gas turbine engine and secures the torch igniter within an opening of the combustor case.

A further embodiment of any of the foregoing torch igniters, wherein the torch igniter ignites fuel in an outer recirculation zone of the combustor.

A further embodiment of any of the foregoing torch igniters, wherein the torch igniter ignites fuel in an inner recirculation zone of the combustor.

A further embodiment of any of the foregoing torch igniters, wherein the cap is configured to receive at least three surface igniters.

A further embodiment of any of the foregoing torch igniters, wherein the combustor case extends along a primary combustor centerline and the torch igniter is oriented such that the torch igniter axis extends radially inward with respect to the primary combustor centerline.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A combustor of a gas turbine engine oriented about an engine axis, the combustor comprising:
   a combustor case extending along a primary combustor centerline to convey compressed airflow from a compressor to a turbine section, wherein the combustor case comprises a torch igniter opening;
   a combustor liner disposed within the combustor case to define a main combustor zone;
   at least one fuel nozzle situated at an upstream end of the combustor liner, relative to the primary combustor centerline; and
   a torch igniter situated partially within the combustor case, the torch igniter comprising:
      a combustion chamber extending along a torch igniter axis, the combustion chamber having axially upstream and downstream ends defining a flow direction through the combustion chamber with respect to the torch igniter axis;
      a cap defining the axially upstream end of the combustion chamber with respect to the torch igniter axis, wherein the cap is disposed radially outward of the combustor case with respect to the primary combustor centerline along which the combustor case extends, and configured to receive at least one surface igniter, at least one air inlet, and at least one fuel injector;
      a tip defining the axially downstream end of the combustion chamber with respect to the torch igniter axis, the tip being radially aligned with the main combustor zone defined by the combustor liner of the gas turbine engine, with respect to the primary combustor centerline, wherein the tip is mounted through the combustor liner during operation of the gas turbine engine;

an annular igniter wall extending along and surrounding the torch igniter axis from the cap to the tip and defining a radial extent of the combustion chamber, the combustion chamber extending radially with respect to the primary combustor centerline from the cap, through the combustor case, to the tip;

a structural wall coaxial with and surrounding the annular igniter wall; and an outlet passage defined by the annular igniter wall within the tip, wherein the outlet passage is fluidly connected to the combustion chamber;

wherein the torch igniter is situated within the torch igniter opening such that the tip is mounted through the combustor liner, the combustion chamber downstream the cap is entirely within the combustor case, and the cap extends through the combustor case;

wherein the tip comprises an elbow between the combustion chamber and the combustor liner which fluidly couples the combustion chamber to the main combustor zone;

wherein the elbow turns 90 degrees from the combustion chamber to the combustor liner; and wherein an outlet portion of the elbow longitudinally extends parallel to the primary combustor centerline.

2. The combustor of claim 1, wherein the torch igniter is oriented such that the torch igniter axis extends radially inward with respect to the primary combustor centerline and the engine axis.

3. The combustor of claim 1, wherein a flange is connected to the combustor case and secures the torch igniter within the torch igniter opening and to the combustor case.

4. The combustor of claim 1, wherein the tip of the torch igniter is mounted to the combustor liner at the upstream end of the combustor liner with respect to the primary combustor centerline.

5. The combustor of claim 4, wherein the torch igniter ignites fuel in an outer recirculation zone of the combustor.

6. The combustor of claim 4, wherein the torch igniter ignites fuel in an inner recirculation zone of the combustor.

7. The combustor of claim 1, wherein the torch igniter axis is oriented perpendicular to the primary combustor centerline.

8. The combustor of claim 1, wherein the cap is configured to receive at least three surface igniters.

9. The combustor of claim 1, wherein the torch igniter is positioned between two fuel nozzles of the combustor.

10. A torch igniter for a combustor of a gas turbine engine, the torch igniter comprising:

a combustion chamber extending along a torch igniter axis, the combustion chamber having axially upstream and downstream ends defining a flow direction through the combustion chamber with respect to the torch igniter axis;

a cap defining the axially upstream end of the combustion chamber with respect to the torch igniter axis, wherein the cap is disposed radially outward of a combustor case of the gas turbine engine with respect to a primary combustor centerline along which the combustor case extends, and configured to receive at least one surface igniter, at least one air inlet, and at least one fuel injector;

a tip defining the axially downstream end of the combustion chamber with respect to the torch igniter axis, the tip being radially aligned with a main combustor zone defined by a combustor liner of the combustor of the gas turbine engine, with respect to the primary combustor centerline, wherein the tip is mounted through the combustor liner during operation of the gas turbine engine;

an annular igniter wall extending along and surrounding the torch igniter axis from the cap to the tip and defining a radial extent of the combustion chamber, the combustion chamber extending radially with respect to the primary combustor centerline from the cap, through the combustor case, to the tip, wherein the combustion chamber downstream the cap is entirely within the combustor case, and the cap extends through the combustor case;

a structural wall coaxial with and surrounding the annular igniter wall; and an outlet passage defined by the annular igniter wall within the tip, wherein the outlet passage is fluidly connected to the combustion chamber;

wherein the structural wall and the annular igniter wall are configured for a pressure level within the combustor case of the combustor during operation of the combustor;

wherein the tip comprises an elbow between the combustion chamber and the combustor liner of the combustor which fluidly couples the combustion chamber to the main combustor zone of the combustor:

wherein the elbow turns 90 degrees from the combustion chamber to the combustor liner of the combustor; and wherein an outlet portion of the elbow longitudinally extends parallel to the primary combustor centerline.

11. The torch igniter of claim 10, wherein a flange is connected to the combustor case of the gas turbine engine and secures the torch igniter within an opening of the combustor case.

12. The torch igniter of claim 10, wherein the torch igniter ignites fuel in an outer recirculation zone of the combustor.

13. The torch igniter of claim 10, wherein the torch igniter ignites fuel in an inner recirculation zone of the combustor.

14. The torch igniter of claim 10, wherein the cap is configured to receive at least three surface igniters.

* * * * *